(12) United States Patent
Sasaki

(10) Patent No.: US 7,344,033 B2
(45) Date of Patent: Mar. 18, 2008

(54) SOLID-LIQUID SEPARATOR

(75) Inventor: Masayoshi Sasaki, Kanagawa-ken (JP)

(73) Assignee: Amukon Kabushiki Kaisha (JP)

( * ) Notice: Subject to any disclaimer, the term of this patent is extended or adjusted under 35 U.S.C. 154(b) by 387 days.

(21) Appl. No.: 11/081,469

(22) Filed: Mar. 16, 2005

(65) Prior Publication Data

US 2006/0037905 A1   Feb. 23, 2006

(30) Foreign Application Priority Data

Aug. 17, 2004   (JP)   ............................ 2004-237624

(51) Int. Cl.
*B01D 33/00* (2006.01)

(52) U.S. Cl. .................... 210/383; 210/415; 210/414; 210/413; 100/117; 100/126; 100/127; 100/128; 100/129; 100/145; 100/146; 100/150; 100/337; 100/338

(58) Field of Classification Search ........ 100/126–129, 100/117, 145, 146, 150, 337, 338; 210/413–415, 210/383, 385; 366/83
See application file for complete search history.

(56) References Cited

U.S. PATENT DOCUMENTS

| | | | | |
|---|---|---|---|---|
| 3,021,782 A | * | 2/1962 | Ginaven | ................... 100/146 |
| 4,467,717 A | | 8/1984 | Yamamoto | |
| 5,333,556 A | | 8/1994 | Isobe et al. | |
| 5,380,436 A | * | 1/1995 | Sasaki | ...................... 210/383 |
| 5,752,770 A | | 5/1998 | Kawaguchi et al. | |

FOREIGN PATENT DOCUMENTS

| | | |
|---|---|---|
| EP | 0 581 965 A1 | 2/1994 |
| JP | 2 268805 A | 11/1990 |
| JP | 2268805 A | 11/1990 |
| JP | 2001-224913 A | 8/2001 |
| JP | 2001224913 A | 8/2001 |
| JP | 2004-237624 | 8/2004 |
| JP | 3565841 B | 9/2004 |

OTHER PUBLICATIONS

"Journal of Water and Waste," vol. 45, No. 2, p. 9 and cover.
Journal of Water and Waste, vol. 45, No. 2, p. 9, Feb. 1, 2003.
"Journal of Water and Waste," vol. 45, No. 2, p. 9 and cover, Feb. 1, 2003.

* cited by examiner

*Primary Examiner*—Krishnan Menon
*Assistant Examiner*—Benjamin Kurtz
(74) *Attorney, Agent, or Firm*—Faegre & Benson LLP

(57) ABSTRACT

To provide a solid-liquid separator in which a treatment object such as sludge can be transported without clogging, liquid can be efficiently separated from the treatment object, and a maintenance operation can be easily conducted. Movable plates 12 and fixed plates 13 are disposed alternately, two screws 21, 22 are disposed in recess sections 14, 15 formed in the movable plates 12 and fixed plates 13, parts of blade sections 25, 26 of the two screws 21, 22 overlap each other, the two screws 21, 22 are rotary driven, and the liquid is discharged from the gap between the movable plates 12 and fixed plates 13, while the treatment object is being transported. When the movable plates 12 are replaced, the two screws 21, 22 are lifted up and then the movable plates 12 are pulled up and replaced.

11 Claims, 14 Drawing Sheets

(a)

(b)

(c)

(a)

(b)

(c)

SOLID-LIQUID SEPARATOR

CROSS-REFERENCE TO RELATED APPLICATION

This application claims the benefit of Japanese Patent Application No. 2004-237624, filed Aug. 17, 2004, the entire contents of which are incorporated by reference.

BACKGROUND OF THE INVENTION

The present invention relates to a solid-liquid separator for separating a liquid from an object to be treated comprising a large amount of the liquid.

BACKGROUND TECHNOLOGY

Solid-liquid separators for separating a liquid from an object to be treated that comprises a large amount of the liquid have been known for a long time (for example, see Patent Reference 1). Examples of objects to be treated that are treated by such solid-liquid separators include organic sludges such as tofu wastes, wastewater from food processing, sewage, or wastewater discharged from hog farms, inorganic sludges such as cutting oils containing cutting chips, wastewater from electroplating, ink-containing wastewater, pigment-containing wastewater, and paint-containing wastewater, and also wastewater containing vegetable chips, fruit skin, bran, and food residues.

The conventional solid-liquid separator has one screw extending through a tubular body. The object to be treated flowing in from the inlet opening located on one side in the axial direction of the tubular body inside the tubular body is transported by the rotation of the screw. At this time, the liquid, that is filtrate, separated from the object to be treated is discharged to the outside of the tubular body through a filtrate discharge gap of the tubular body. On the other hand, the treated object with the reduced content of liquid is discharged to the outside of the tubular body through an outlet opening located on the other end side in the axial direction of the tubular body.

However, when an object to be treated that easily looses flowability is subjected to dewatering treatment by using the conventional solid-liquid separator, the treatment object with an advanced degree of liquid separation looses its flowability inside the tubular body, cannot be transported by the screw and can clog the inside of the tubular body. In particular, the inside of the tubular body is especially easily clogged by inorganic sludges or tofu wastes, vegetable chips, fruit skins, bran, or food residues.

The inventors have disclosed a solid-liquid separator comprising a multiplicity of movable plates and two screws extending through holes formed in the movable plates (Japanese Patent Application No. 2004-31583 filed on Feb. 9, 2004; U.S. Pat. No. 3,565,841) and this solid-liquid separator has found practical use. With such a solid-liquid separator, the above-described drawbacks can be overcome and clogging of the treatment object is prevented.

However, in the solid-liquid separator of such system, the movable plates unavoidably wear with time. As a result, when the movable plates are replaced, one or two screws are pulled out in the axial direction thereof from a multiplicity of movable plates and disassembled, and then one or two screws are inserted in the axial direction thereof into holes of a multiplicity of new movable plates and assembled. Accordingly, the operation of replacing the movable plates is very difficult and time consuming.

[Patent Reference 1] JP Hei7-10440 B

DISCLOSURE OF INVENTION

Problems Addressed by Invention

It is an object of the present invention to provide a solid-liquid separator making it possible to replace the movable plates in an easy manner.

Means For Resolving Problems

In order to attain the above-described object, the present invention provides a solid-liquid separator comprising a plurality of movable plates having recess sections open upward and two screws extending through the recess sections of those movable plates, wherein the recess sections of said movable plates are set to a size such that said movable plates are pushed to move by the blade sections of the two rotating screws and the recess sections are formed to a shape allowing the screws to be lifted up.

Further, in the solid-liquid separator of the above-described configuration, the two screws are preferably disposed so that parts of the blade sections thereof overlap each other.

Further, in the solid-liquid separator of the above-described configuration, the winding direction of the blade sections of the screws and the rotation direction of the screws are so set that the object to be treated is transported in substantially the same direction by the screws.

Further, the solid-liquid separator of the above-described configuration preferably further comprises a plurality of fixed plates having recess sections open upward, the movable plate are disposed between the fixed plates, and the two screws extend through the recess sections formed in the fixed plates and the recess sections formed in the movable plates, and the recess sections of the fixed plates are also formed to a shape allowing the screws to be lifted up. In this case, a configuration in which the fixed plates and movable plates are disposed alternately one after another and a configuration in which some of the movable plates are disposed between fixed plates, can be assumed.

It is also preferred that a filtrate flows down through gaps between the movable plates and fixed plates.

It is further preferred that the apparatus comprises a detachable cover for covering the upper part of the movable plates or a detachable cover for covering the upper part of the movable plates and fixed plates.

Effects of Invention

In accordance with the present invention, the movable plates can be easily replaced.

PREFERRED EMBODIMENTS FOR CARRYING OUT INVENTION

The preferred embodiments of the present invention will be described hereinbelow in greater detail with reference to the appended drawings.

FIG. 1 is a plan view of the solid-liquid separator apparatus of the present embodiment. FIG. 2 is a vertical cross-sectional view illustrating the solid-liquid separator. With the solid-liquid separator shown in the figures, any of the above-described objects to be treated can be subjected to solid-liquid separation. Here, the explanation will be conducted with respect to the case, where a sludge containing a large quantity of water is subjected to dewatering treatment.

The solid-liquid separator of the present embodiment comprises an inlet member 1 and an outlet member 2. A solid-liquid separation unit 3 is disposed between those members 1 and 2. The upper parts of the inlet member 1 and solid-liquid separation unit 3 are covered with a removable cover 5. FIG. 3 is a plan view of the solid-liquid separator corresponding to FIG. 1 in a state with removed cover 5.

FIG. 4 is a perspective view of the disassembled inlet member 1 side. The inlet member 1, as shown in FIGS. 2 to 4, and in particular as follows from FIG. 4, comprises a bottom wall 6 that is concaved downward, flat plate sections 7, 8 integrally connected to end sections of the bottom wall 6, and a pair of side plates 9, 10 hanging downward from the bottom wall 6 and flat plate sections 7, 8.

Further, FIG. 5 is a perspective view of the outlet member. FIG. 6 is a perspective view showing a state where a partition and a bearing plate were separated from the main body of the outlet member. The outlet member 2, as shown in FIGS. 2, 3, 5, and 6, and in particular as follows from FIGS. 5 and 6, comprises a main body 11 formed to have a substantially rectangular cross section and open upward and downward. Notches 37, 38 are respectively formed in a side wall (first side wall) 16 on the side of the main body 11 facing the solid-liquid separation unit 3 and in a side wall (second side wall) 17 that is located opposite the first side wall. A partition plate 27 and a bearing plate 28 are disposed in the notch 37 and notch 38, respectively. As shown in FIG. 5, the partition plate 27 and 7 bearing plate 28 are detachably fixed to the main body 11 with bolts 29, 75 and nuts threaded thereon. As shown in FIG. 6, the partition plate 27 and bearing plate 28 can be separated from the main body 11 by loosening the bolts 29, 75. Furthermore, the opening in the lower part of the main body constitutes a discharge opening 36 for discharging the sludge that was subjected to dewatering treatment.

The solid-liquid separation unit 3 of the present embodiment, as shown in FIGS. 2 to 4, comprises a plurality of movable plates 12 and a plurality of fixed plates 13. As shown in FIG. 7 and FIG. 8, recess sections 14, 15 opened upward are formed in each movable plate 12 and fixed plate 13, respectively. Furthermore, ring-like or cylindrical spacers 30 are disposed between all the fixed plates 13, and bolts 18, 19 are inserted into those spacers 30 and mounting holes 32, 33 (FIG. 4; shown also in FIG. 8) formed in each fixed plate 13. In the example shown in the figure, a total of four bolts are used, namely, two bolts 18 passing through the two mounting holes 32 formed below the recess section 15 of each fixed plate 13 and two bolts 19 passing through two mounting holes 33 formed on each side of the recess section 15. In order to simplify the drawing and clarify the relationship between all the members, FIG. 4 shows only one bolt 19 of those bolts, one spacer 30 mated therewith, the inlet member 1, one movable plate 12, one fixed plate 13, and a fixed plates 13A of a different shape. The fixed plates 13 can be also formed integrally with the spacer.

As shown in FIG. 2 and FIG. 3, the bolts 18, 19 pass through the side plate (first side wall) 9 on the side of the inlet member 1 facing the solid-liquid separation unit 3 and the first side wall 16 of the main body 11 of the outlet member 2, and the nuts 20 are threaded on the bolts 18, 19 and tightened. Thus, the fixed plates 13 are arranged in the axial direction thereof, the prescribed spacing being provided therebetween with the spacers 30, and integrally fixed with respect to each other with the bolts 18, 19 and nuts 20. Further, they are also fixed with respect to the inlet member 1 and outlet member 2. The fixed plates disposed with a spacing provided by the spacers can be also assembled with a slight play (so that they can move slightly).

FIG. 7 is a partial horizontal view showing the enlarged solid-liquid separation unit of the solid-liquid separator shown in FIG. 1. As shown in this figure, the movable plates 12 are disposed in the gaps between the fixed plates 13. The thickness T of each movable plate 12 is set smaller than the width G of the gap between the fixed plate 13, and a gap g of, for example, about 0.5-1 mm is formed between the end surface of each fixed plate 13 and the end surface of the movable plate 12 facing it. The gap g serves to pass the liquid separated from the sludge as described hereinbelow, that is, to pass the filtrate (filtrate discharge gap). The thickness T of the movable plates 12 is set, for example, to about 1.5 mm, and the thickness t of the fixed plates 13 is set, for example, to about 3 mm.

As shown in FIG. 8 corresponding to the enlarged section along the line VIII-VIII in FIG. 2, each movable plate 12 is placed on the spacer 30 mated with two bolts 18 on the lower side and is disposed between two spacers 30 mated with two bolts 19 on the upper side. With such a configuration, the movable plates 12 are prevented from falling down. Moreover, each movable plate 12 can move in the direction parallel to the end surface of the fixed plate 13 in the gap between the fixed plates 13.

Further, as shown in FIGS. 1 to 3, FIG. 7, and FIG. 8, the solid-liquid separator comprises two screws 21, 22. Those screws 21, 22 extend through the recess zone bounded by the bottom wall 6 of the inlet member 1, recess sections 15 formed in the fixed plate 13, and recess sections 14 formed in the movable plates 12. The screws 21, 22 shown in the present embodiment comprise shafts 23, 24 and spiral blade sections 25, 26 formed integrally with the shafts 23, 24, respectively. In the example shown in the figure, the blade sections 25, 26 are formed as a single blade, but they may be obviously formed as multiple blades, for example, like double or more threaded screw.

Further, as shown in FIG. 2, FIG. 5, and FIG. 6, two semicircular notches 39, 40 are formed in the partition plate 27 of the outlet member 2, and the notch 37 of the first side wall (side wall facing the solid-liquid separation unit 3) 16 of the main body 11 has two semicircular notches 41, 42. The notches 39, 40 and notches 41, 42 form two cylindrical holes 43, 44. The shafts 23, 24 of the screws 21, 22 (not shown in FIG. 5 or FIG. 6) extend through the holes 43, 44, respectively. As shown in FIG. 2, the diameter of holes 43, 44 is larger than the diameter of shafts 23, 24.

Further, as shown in FIGS. 1 to 3, FIG. 5, and FIG. 6, bearing cups 47, 48 that accommodate bearings 45, 46 inside thereof are fixed to the bearing plate 28 disposed in a notch 38 formed in the second side wall 17 of the main body 11 of the outlet member 2. As shown in FIGS. 1 to 3, one end portion of each shaft 23, 24 of the screws 21, 22 is inserted into the bearing cups 47, 48, respectively, and rotatably supported in the bearing cups 47, 48 via the bearings 45, 46.

Further, as shown in FIGS. 1 to 3, a gear box 49 is fixed to the inlet member 1. A gear shaft 54 having a gear 52 fixed thereto is rotatably supported via a bearing in each side wall 50, 51 of the gear box 49. A motor 55 is fixedly supported on the side wall 51 on the side opposite that of the inlet member 1, and an output shaft 56 of the motor extends through the two side walls 50, 51. A gear 53 is also fixed to this output shaft 56, and this gear 53 and the above-mentioned gear 52 are engaged with each other inside the gear box 49.

As shown in FIG. 9, one end portion of the gear shaft 54 and one end portion of the output shaft 56 are formed to be hollow, and engagement pieces 58 are fixedly disposed in the central parts of a hollow portions 57. On the other hand, as shown in FIG. 9, engagement grooves 59 are formed in the end portions of the shafts 23, 24 of screws 21, 22 that face the gear shaft 54 and output shaft 56. The end portions of the shafts 23, 24 are inserted into hollow portions 57 of the gear shaft 54 and output shaft 56, as shown in FIG. 3, and the engagement grooves 59 formed in the shafts 23, 24 are detachably engaged with the engagement pieces 58 provided in the gear shaft 54 and output shaft 56, respectively. Therefore, when the motor 55 is actuated and the output shaft 56 is rotated, this rotation is transmitted to the gear shaft 54 via the gears 53, 52. At the same time, the rotation of the output shaft 56 and gear shaft 54 is transmitted to the screws 21, 22 via the mutually engaged engagement pieces 58 and engagement grooves 59, respectively and the screws 21, 22 rotate around the central axes X1, X2 thereof.

As shown in FIG. 7 and FIG. 8, the two screws 21, 22 are disposed, without being in contact with each other, in a state in which parts of the blade sections 25, 26 overlap. Thus, the two screws 21, 22 are positioned so that parts of the blade sections 25, 26 overlap, when viewed in the direction of the central axes X1, X2 thereof. In FIG. 8, the overlapping portion of the blade sections 25, 26 of the screws 21, 22 is hatched and denoted by the reference symbol OL.

Further, in the example shown in the figure, the screws 21, 22 are arranged side by side parallel to each other, as shown in FIG. 3, but the two screws 21, 22 may be also arranged side by side so that the central axes X1, X2 of the screws 21, 22 are slightly inclined with respect to each other. The size and form of the recess sections 14, 15 in the movable plates 12 and fixed plate 13 are obviously set so that the plates do not hinder the rotation of the two screws 21, 22. Further, in the solid-liquid separator of the present embodiment, the pitch of the blade sections 25, 26 of the screws 21, 22 decreases gradually from the side of the inlet member 1 to the side of the outlet member 2. However, it is also possible to set a uniform pitch over the entire length of the screws.

As shown in FIG. 2, the side wall 50 of the gear box 49 on the side of the inlet member extends downward and has a flange section 60 protruding in the horizontal direction from the lower end thereof. This flange section 60 is fixed to a frame stay 61 for supporting the solid-liquid separator. Similarly, a flange section 62 provided in a protruding condition on the first side wall 16 of the outlet member 2 is also fixed to a frame stay 63. Furthermore, among a multiplicity of the fixed plates 13, in the fixed plate denoted by a reference symbol 13A in FIGS. 2 to 4, the lower end thereof extends downward further than other fixed plates 13 and has a flange section 64 producing horizontally from the lower end thereof. This flange section 64 is fixed to a frame stay 65. The entire solid-liquid separator is thus supported on the frame by fixing a plurality of flange sections 60, 62, 64 to the frame stay 61, 63, 65.

Further, as shown in FIG. 3 and FIG. 4, a pair of tongue pieces 66, 67 are provided in a protruding condition at the upper part of the fixed plate 13A serving as a support column and, as shown in FIG. 3, a pair of tongue pieces 68, 69 are provided in a protruding condition on the first side wall 16 of the outlet member 2. Flange sections 70, 71 of the cover 5 are placed, as shown in FIG. 1, above those tongue pieces 66, 67, 68, 69 and flat plate sections 7, 8 of the inlet member 1, and the flange sections 70, 71 are detachably fixed to the tongue pieces 66, 67, 68, 69 and flat plate sections 7, 8 with bolts 72 and nuts. Further, as shown in FIG. 1 and FIG. 2, a charging orifice 4 for charging the object to be treated is formed in the portion of the cover 5 corresponding to the bottom wall 6 of the inlet member 1.

Other configurations of the solid-liquid separator will be described below, while explaining the operation of the solid-liquid separator.

As shown by an arrow A in FIG. 2, a sludge (not shown in the figures) comprising a large quantity of water flows through the charging orifice 4 onto the bottom wall 6 of the inlet member 1. The water content ratio of the sludge prior to the treatment is, for example, about 99 wt. %. A flocculant is admixed in advance to the sludge, to flocculate the sludge. For some objects to be treated, it is possible not to admix the flocculant.

The output shaft 56 and screw 22 are rotary driven by the actuation of the motor 55, and this rotation is transmitted to the gear shaft 54 via the gears 53, 52, thereby also rotary driving the screw 21. Thus, the two screws 21, 22 are rotated around the central axes X1, X2 thereof, and the sludge that has flown into the inlet member 1 flows into a space S formed by the recess sections 15, 14 of a multiplicity of fixed plates 13 and movable plates 12 and the cover 5, and is transferred toward the side of the outlet member 2 as shown by an arrow B in FIG. 2.

When the sludge moves through the space S formed by the recess sections 15, 14 of a multiplicity of fixed plates 13 and movable plates 12, which are disposed alternately in the above-described manner, and the cover 5, water is separated from the sludge and the separated water, that is, the filtrate is released to the outside through each filtrate discharge gap g (FIG. 7) located between the fixed plates 13 and movable plates 12. The filtrate discharged in such a manner flows down as shown by arrows C1, C2, C3, C4 in FIG. 2. It is received by a receiving plate 35 fixed to the stays 61, 63 and released downward through a discharge opening 76 of the receiving plate 35. Because the filtrate still contains a certain amount of solid components, the filtrate is again treated with water together with another sludge and then subjected to dewatering with the solid-liquid separator.

As described hereinabove, the water content ratio of the sludge transported through the space S decreases, and the sludge with the reduced content of water is discharged into the outlet member 2 via the holes 43, 44 formed the outlet member 2, as shown by the arrow D in FIG. 2, and then falls down. The water content ratio of the sludge after such a dewatering treatment is, for example, about 80 wt. %. As shown in FIG. 1 to FIG. 3, back pressure plates 73, 74 are fixed to the shafts 23, 24 in the inner space of the outlet member 2 opposite the first side wall 16 of the outlet member 2 and the partition plate 27, thereby making it possible to increase the pressure applied to the sludge located in the space S.

As described hereinabove, in the solid-liquid separator of the present embodiment, the sludge as an example of the treatment object is transported from the side of the inlet member 1 to the side of the outlet member 2 by the rotation of the screws 21, 22. Thus, the winding direction of the blade sections 25, 26 of the screws 21, 22 and the rotation direction of the screws 21, 22 are so set that the object to be treated is transported in substantially the same direction by the screws 21, 22. In the example shown in the figure, one screw 21 positioned on the left side is rotary driven clockwise and the other screw 22 positioned on the right side is rotary driven counterclockwise, as shown in FIG. 8.

When water and solid components of the sludge are separated in the space S, a very small amount of solid components unavoidably penetrates into the filtrate discharge gap g. With the conventional configuration, if no measures are taken, the gap g is clogged. However, in the solid-liquid separator of the present embodiment, the blade sections 25, 26 apply pressure to the movable plates 12 because of the rotation of the two screws 21, 22, and the end surfaces of the movable plates 12 move with respect to the end surfaces of the fixed plates 13 that face then. As a result, the solid components that have penetrated into the filtrate discharge gap g are effectively discharged from the gap g by such scraping action on the end surfaces and the aforementioned clogging of the gap is prevented.

FIGS. 10 to 12 show schematically how the movable plates 12 are pushed to move by the two screws 21, 22. In those figures, the screws 21, 22, movable plates 12, and fixed plate 13 are shown by solid lines. The cross-sectional sections 25A, 26A of the blade sections 25, 26 shown in FIG. 8 are shown by normal lines.

The movement of the movable plates 12 will be explained herein with reference to FIG. 8 and FIGS. 10 to 12. If the cross-sectional portions 25A, 26A of the blade sections 25, 26 are called the blade section parts, then in the state shown in FIG. 8, the blade section parts 25A, 26A will both be directed to the right, as shown in figure. At this time, the blade section part 25A of the left screw 21 is not in contact with the movable plates 12, but the blade section 26A of the right screw 22 pushes the movable plate 12 to the right, as shown in the figure, and the movable plate 12 takes the rightmost position.

From this state, the left screw 21 rotates clockwise and the right screw 22 rotates counterclockwise, but when the blade section parts 25A, 26A are in the position shown in FIG. 10, the blade part 26A is also separated from the movable plate 12, and the movable plate 12 takes the rightmost position, without being pushed by the blade section parts 25A, 26A.

When the screw further rotates and the blade section parts 25A, 26A take the position shown in FIG. 11, then the blade section part 25A of the left screw 21 pushes the movable plate 12 to the left, as shown in the figure, and the movable plate 12 is pushed to the left. Following subsequent rotation of the screws 21, 22, the movable plates 12 are further pushed leftward by the blade section part 25A and, as shown in FIG. 12, when the blade section parts are directed leftward, as shown in the figure, the movable plates 12 take the leftmost position. This movement is continuously repeated. At this time, the dimensions of the blade section parts 25A, 26A of the rotating screws 21, 22 are so set that the blade section parts are not in direct contact with the fixed plates 13, inlet member 1, and cover 5.

As described hereinabove, the movable plates 12 reciprocally move in the left-right direction, while maintaining a substantially horizontal state, as was explained with reference to FIG. 8 and FIGS. 10 to 12. As a result, the movable plates 12 move almost horizontally with respect to the fixed plates 13, and the filtrate discharge gap g (FIG. 7) between the movable plates 12 and fixed plates 13 is constantly cleaned. As a result, it is possible to prevent the filtrate discharge from being hindered by the penetration of solid substances into the gap and clogging of the gap g. The above-described effect is demonstrated because the size and shape of the recess sections 14 in the movable plates 12 are so set that the movable plates 12 are pushed to move by the blade section parts 25, 26 of the two rotating screws 21, 22 and the configuration ensures that the filtrate flows down through the gap between the movable plates 12 and fixed plates 13.

With the above-described solid-liquid separator, the object to be treated can be transported inside the space S by the two screws 21, 22. In particular, because portions of the blade section parts, 25, 26 of the two screws 21, 22 are disposed in a mutual overlapping state (shown in FIG. 8), the treatment object is prevented form clogging the space S even when the object is a substance that easily looses flowability. When the object to be treated that was dewatered and lost some flowability inside the space S sticks or almost sticks to the surface of the screws 21, 22, portions of the blade section parts 25, 26 that overlap each other rotate, while scraping off the object, and crush the object. Therefore, the treatment object is prevented from clogging the space S. As a result, the objects such as inorganic sludges, waste tofu, vegetable chips, fruit skin, or bran or food residues in which clogging could easily occur, can be effectively separated into solids and liquid.

In particular, as follows from FIG. 8, when the left screw 21 rotates clockwise and the right screw 22 rotates counterclockwise, then the screws 21, 22 enter from above into the portion where the blade sections 25, 26 overlap, the blade sections 25, 26 of the two screws 21, 22 forcibly feed the treatment object into the overlapping portion, and the object can be effectively transported, without stagnation.

Further, because the movable plates 12 wear out as the above-described solid-liquid separation operation is repeated, they have to be replaced with new movable plates. This replacement operation can be conducted very easily as described in the example below.

After the actuation of the motor 55 has been stopped, the six bolts 72 shown in FIG. 1 are loosened and removed. The cover 5 is lifted up and then the cover 5 is removed. As a result, as shown in FIG. 3, the space above the screws 21, 22, movable plates 12, and fixed plates 13 is opened.

Then, the bolts 29, 75 of the outlet member 2 shown in FIG. 5 are loosened and removed, the partition plate 27 is removed as shown in FIG. 6, the bearing plate 28 is moved in the direction of arrow E, and the bearing cups 47, 48 are detached from the shafts 23, 24 of the screws 21, 22. As a result, the restrictions placed on the end portions of the screws 21, 22 on the side of the outlet member are released.

Then, the screws 21, 22 are pulled in the direction shown by arrow F in FIG. 3 and the screws 21, 22 are shifted in the axial direction through a very small distance. As a result, as shown in FIG. 9, the end sections of the shafts 23, 24 of the screws 21, 22 on the gear box side are detached from the hollow sections 57 of the gear shaft 54 and outlet shaft 56, respectively. The restrictions placed on the end sections of the screws 21, 22 on the gear box side are thus released. As a result of the above-described detachment process, the screws 21, 22 can be directly lifted up. The recess sections 14, 15 formed in the movable plates 12 and fixed plates 13 are formed to have a shape that does not create an obstacle when the screws 21, 22 are lifted up.

As described hereinabove, if the screws 21, 22 are detached from the recess sections 14, 15 of the movable plates 12 and fixed plates 13, each movable plate 12 can be directly lifted up and removed. After all the movable plates 12 have been detached, new movable plates 12 are installed and the screws 21, 22 are assembled in the sequence reversed with respect to the above-described sequence.

In the conventional solid-liquid separator, the screws were inserted into the holes formed in the movable plates and fixed plates. Therefore, when the movable plates were replaced, it was necessary to pull the screws out of the movable plates and fixed plates in the axial directions thereof. As a result, the operation of replacing the movable plates was very troublesome. By contrast, in the solid-liquid separator of the present embodiment, the screws 21, 22 can be lifted up and removed. Therefore, the replacement of the movable plates 12 can be conducted in an easy manner.

As described hereinabove, the width size of the top openings of the recess sections 14, 15 of the movable plates 12 and fixed plates 13 are so set that the two screws 21, 22 can be lifted up at the same time. However, the width of those openings can be set smaller than in the example illustrated by the drawings and the width size of the top openings of the recess sections 14, 15 may be so set that the two screws 21, 22 are lifted up one by one, rather than simultaneously. In both cases the size of the screws 14, 15 is so set that the screws can be lifted up.

However, as described hereinabove, the recess sections 14 of the movable plates 12 have to be so formed that the movable plates 12 can be pushed by the blade sections 25, 26 of the two rotating screws 21, 22. FIG. 8 shows an example of the recess sections 14, 15 of the movable plates 12 and fixed plates 13. The shape of those recess sections 14, 15 will be described below in greater detail.

FIG. 13 illustrates the shape of the recess section 14 of the movable plate 12. First, as shown in FIG. 13(a), two circles MC having the same diameter MD are disposed so that parts thereof overlap. Then, two common tangential lines MT are drawn to those circles MC. At this time, an ellipse CR is formed as shown in FIG. 13(b) by the two common tangential lines MT and two circular arcs positioned on the opposite side from the side where the two circles MC overlap. When a vertical line VL1 of a very small length is added to the lower half LCR of the ellipse CR, as shown in FIG. 13(c), then the form of the recess section 14 of the movable plate 12 shown in FIG. 8 is formed. Further, the outer diameter SD of the screws 21, 22 is set to be very slightly smaller than the diameter MI) of the circle MC of the recess section 14. Moreover, as shown in FIG. 13(c), the distance ML between the centers of the two circles MC is set less than the distance SL between the central axial lines X1, X2 of the two screws 21, 22. As a result, the rotation of the screws 21, 22 is not hindered by the movable plates 12, and the movable plates 12 can be pushed in the above-described manner by the rotation of the screws 21, 22.

The recess section 14 of the movable plate 12 and the screws 21, 22 can be formed to have dimensions and shapes different from those of the above-described example, but if they are composed in the above-described manner, the movable plates 12 can be reliably pushed by the rotation of the screws 21, 22 and compact movable plates 12 can be formed. Specific numerical examples of the dimensions of the movable plates 12 and screws 21, 22 shown in FIG. 13 are as follows: MD=86 mm, ML=63 mm, SD=85 mm, SL=68 mm.

The shape of the recess section 15 of the fixed plate 13 shown in FIG. 8 will be explained below. First, as shown in FIG. 14(a), two circles FC having the same diameter FD are disposed so that parts thereof overlap. The centers C of those circles FC coincide with the central axial lines X1, X2 of the screws 21, 22 (that is, the distance between C and C is SL). Moreover, the diameter FD of each circle FC is equal to the diameter MD of the circles MC of the movable plate 12 shown in FIG. 13. Here, when two common tangential lines FT are drawn to the two circles FC, an ellipse AR shown in FIG. 14(b) is formed by the two common tangential lines FT and two circular arcs positioned on the opposite side from the side where the two circles FC overlap. When a vertical line VL1 of a very small length is added to the lower half ARL of the ellipse AR, as shown in FIG. 14(c), then the recess section 15 of the fixed plate 13 shown in FIG. 8 is obtained.

Forming the recess sections 14 of the movable plates 12 and the recess sections 15 of the fixed plates 13 in the above-described manner makes it possible to scrape off effectively the treatment object present inside the recess sections 14, 15 with the blade sections 25, 26 of the screws 21, 22.

In another possible mode, a plate portion (range below the overlapping portions of screws) shown by a two-dot-dash line in FIG. 8 and denoted by a reference symbol 15A is added to the fixed plate 15 of the above-described embodiment in order to form another fixed plate. On the other hand, a portion (range in the vicinity of the upper circumference of the screws) shown by a two-dot-dash line in FIG. 8 and denoted by a reference symbol 5A is added to the cover 5 in order to form another cover. If those components are assembled, the pressure applied to the treatment object inside the space S can be increased and the dewatering efficiency thereof can be increased.

In addition to the movable plates 12, the above-described solid-liquid separator comprises a plurality of fixed plates 13 having recess sections 15 opened upward, and the movable plates 12 are disposed between the fixed plates 13. Thus, the apparatus is so configured that the movable plates 12 and fixed plates 13 are disposed alternately and the movable plates 12 are actuated with respect to the fixed plates 13. However, the present invention is not limited to the above-described configuration. For example, in another possible configuration, the fixed plates are not provided, only a large number of movable plates 12 are disposed, the two screws 21, 22 are passed through the recess sections 14 of those movable plates 12, the filtrate is caused to flow through the gaps between the movable plates 12, the movable plates 12 are moved by the rotation of the screws 21, 22 in the same manner as described hereinabove with reference to FIG. 8 and FIGS. 10 to 12, and accumulation of solids between the movable plates 12 is prevented by relative movement thereof. Alternatively, the arrangement of a plurality of movable plates between adjacent fixed plates can be also appropriately taken.

The solid-liquid separator of any such mode comprises a plurality of movable plates having recess sections opened upward and two screws extending through the recess sections of the movable plates, wherein the recess sections of the movable plates are set to a size such that the movable plates are pushed to move by the blade sections of the two rotating screws and the recess sections are formed to have a shape allowing the screws to lifted up.

Furthermore, the solid-liquid separator shown in the drawings has a detachable cover 5 for covering the top portions of the movable plates 12 and fixed plates 13, but in certain cases the cover 5 can be omitted.

Further, in another possible configuration, a plurality of movable plates 12 are tilted so that the side where the treatment object is charged into the space S is positioned lower than the side where the treatment object with a reduced content of liquid is discharged, and the pressure applied by the treatment object increases as the treatment object located in the space S approaches the discharge side.

Figure 1:
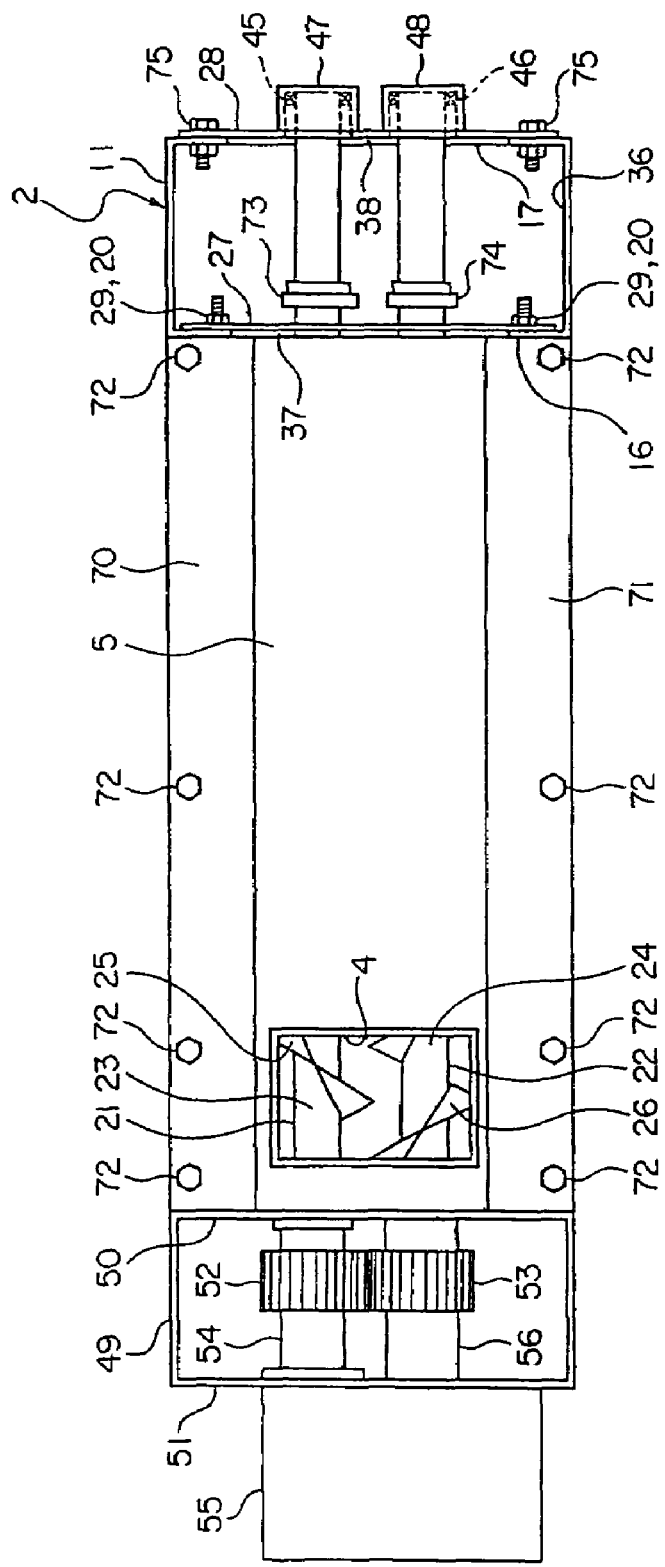
FIG. 1 is a plan view of a solid-liquid separator.
Figure 2:
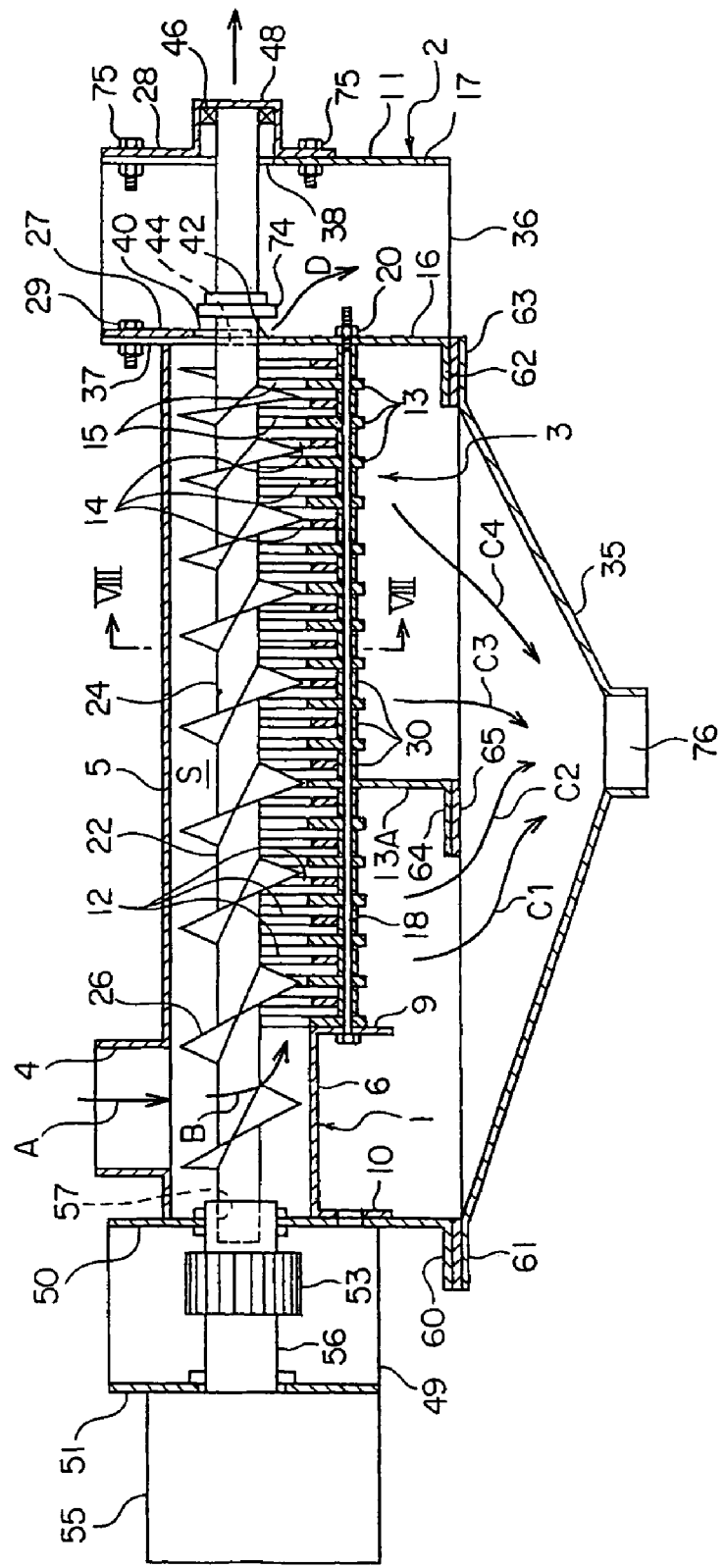
FIG. 2 is a vertical sectional view of the solid-liquid separator shown in FIG. 1.
Figure 3:
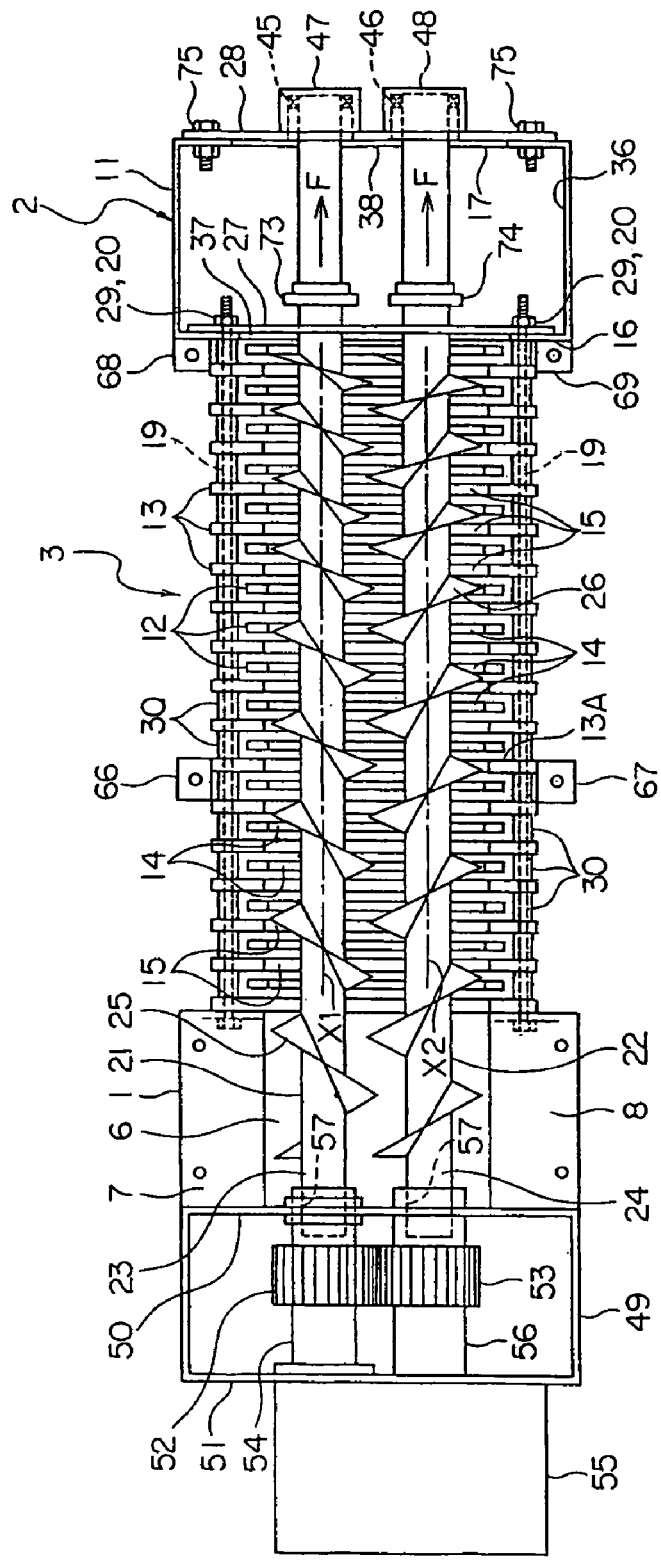
FIG. 3 is a plan view of the solid-liquid separator from which the cover has been removed.
Figure 4:
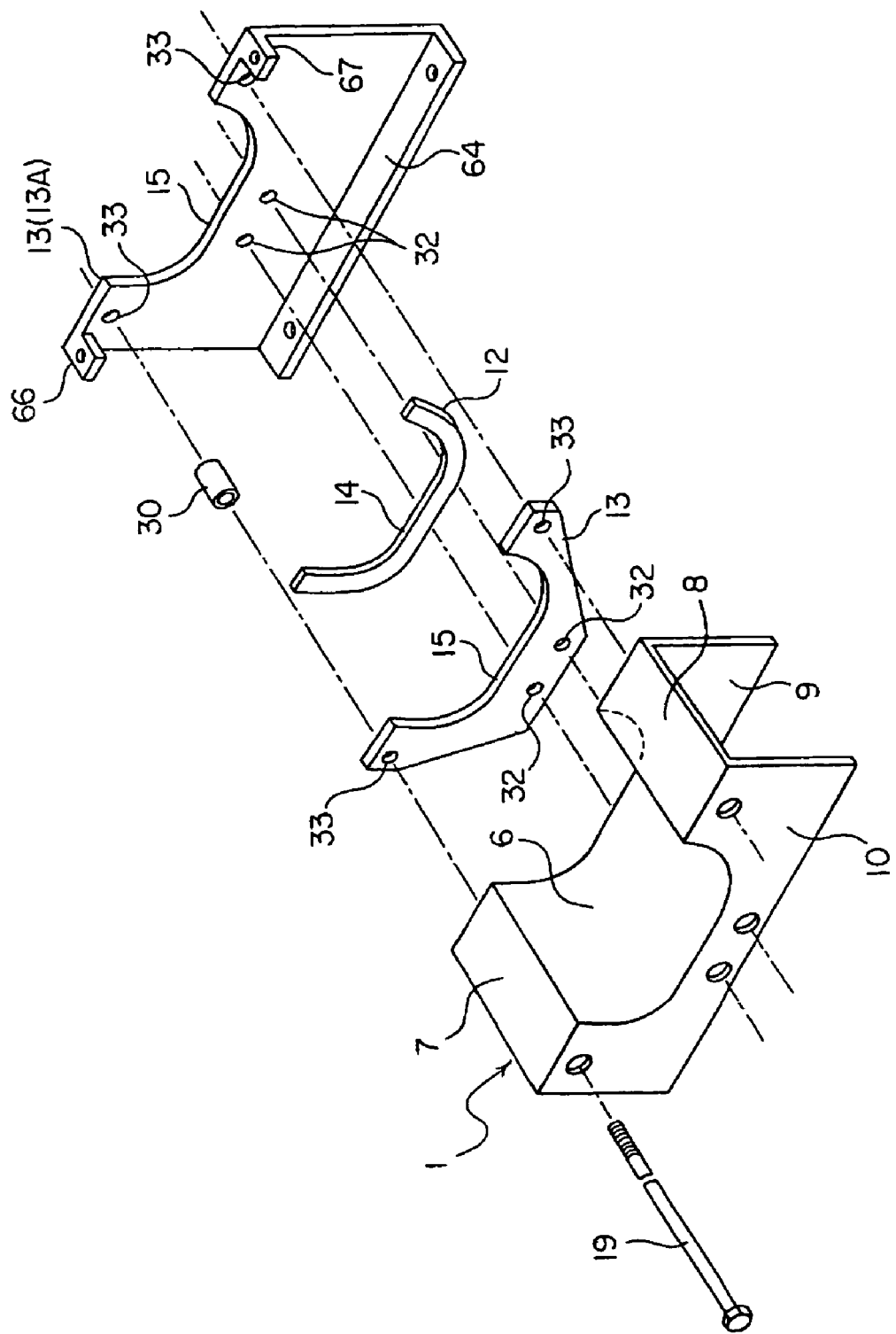
FIG. 4 is an exploded perspective view of the inlet member, movable plate, fixed plate, spacer, and bolt.
Figure 5:
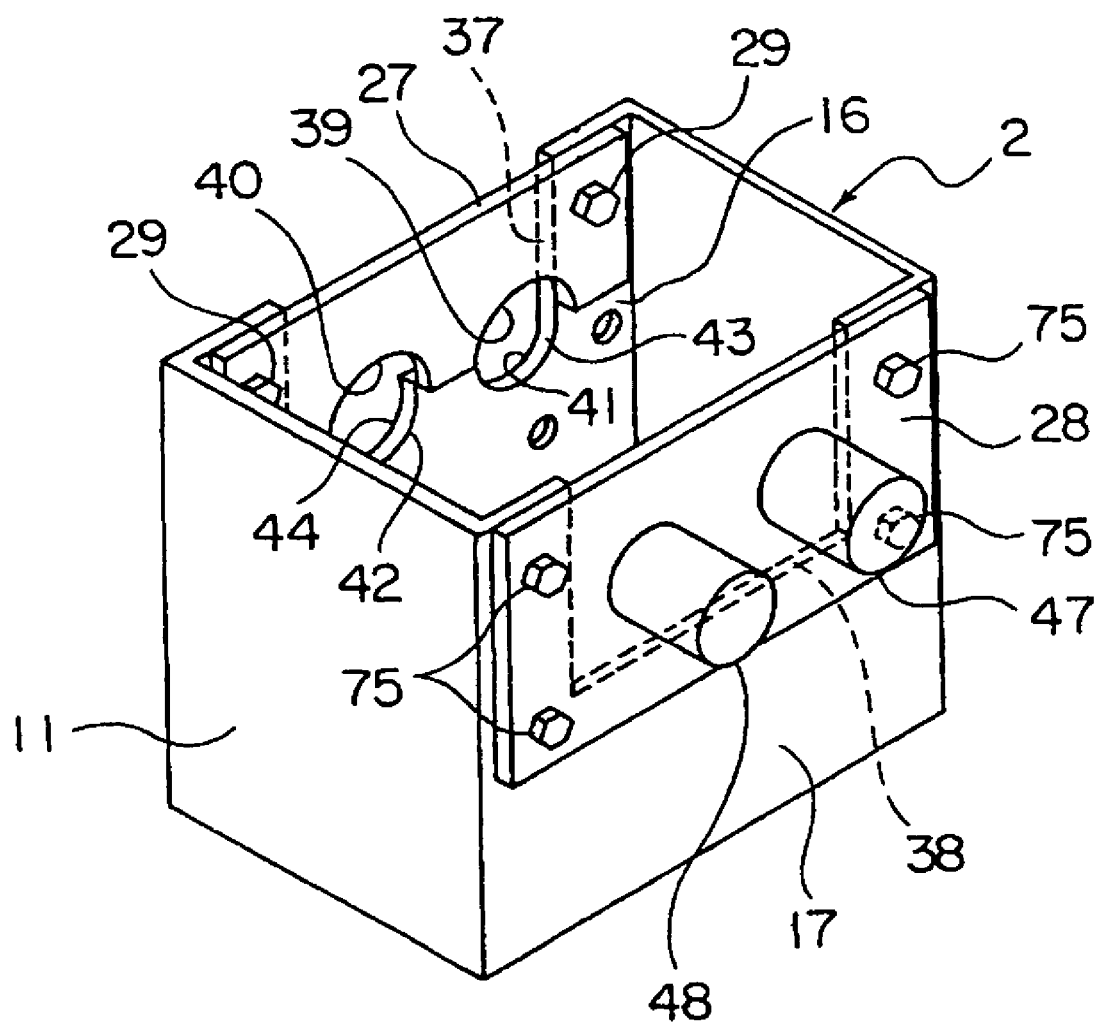
FIG. 5 is a perspective view of the outlet member.
Figure 6:
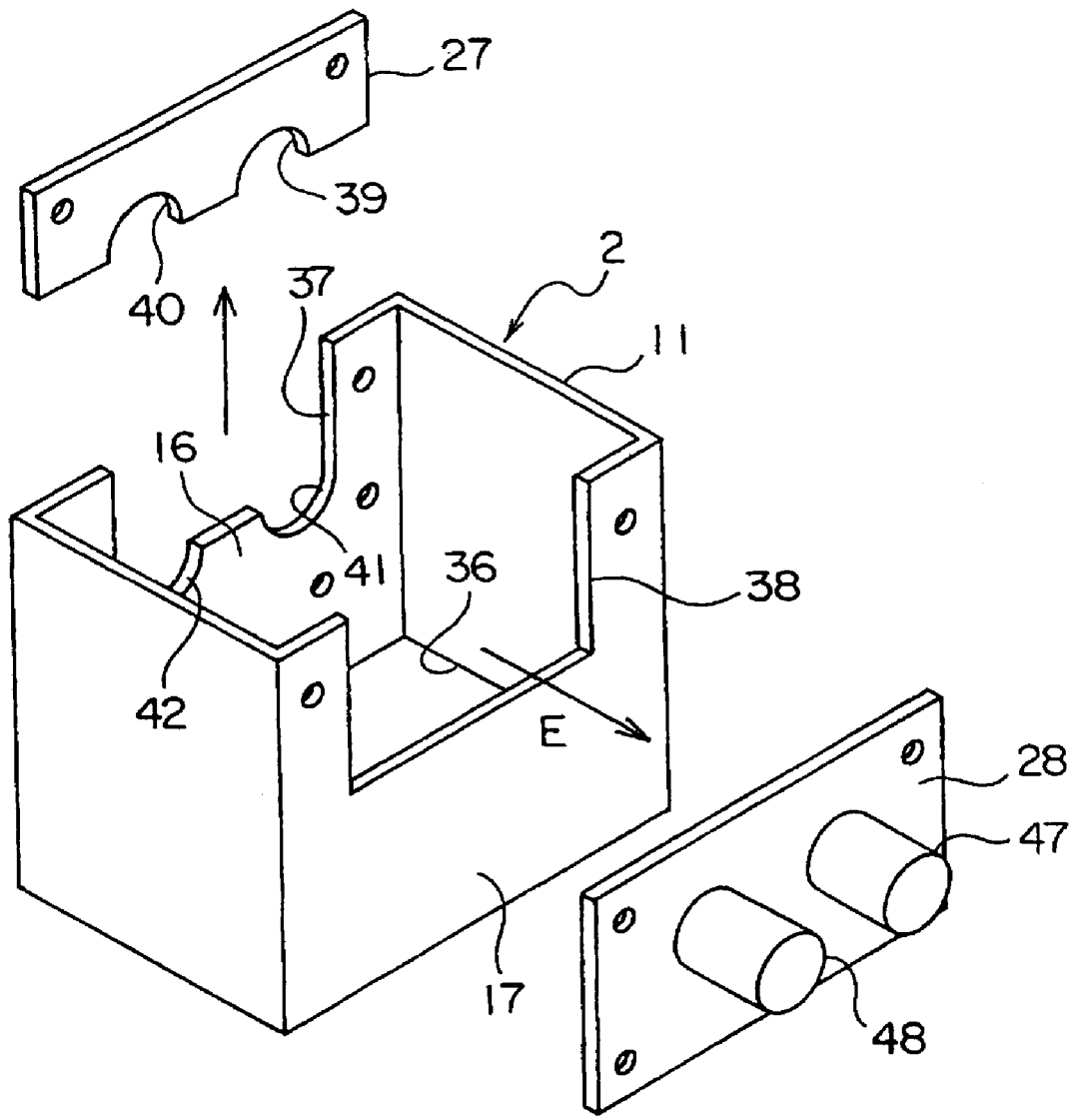
FIG. 6 is a perspective view illustrating a state in which the partition plate and bearing plate are removed from the body of the outlet member.
Figure 7:
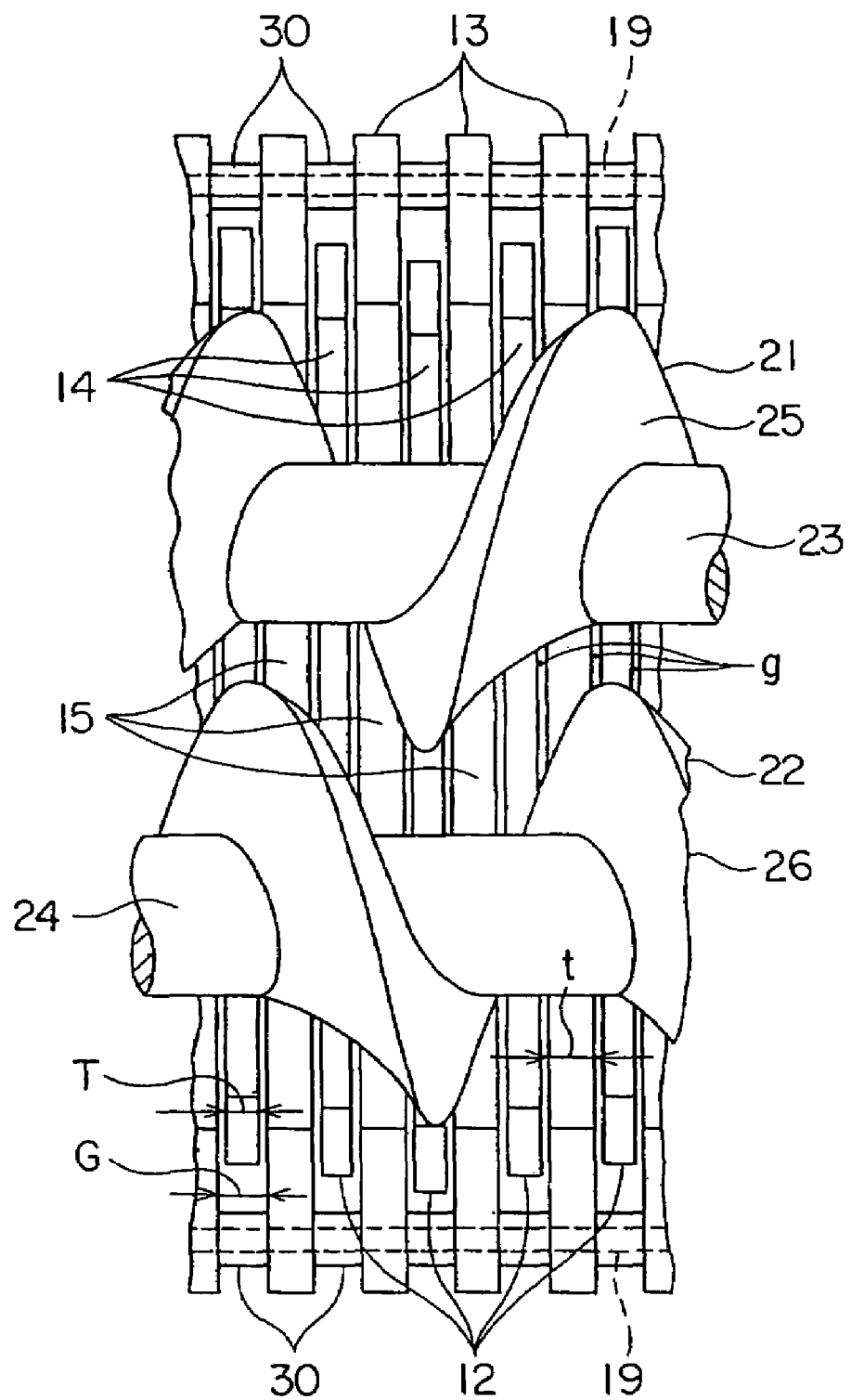
FIG. 7 is an enlarged horizontal sectional view in the solid-liquid separation section of the solid-liquid separator shown in FIG. 1.
Figure 8:
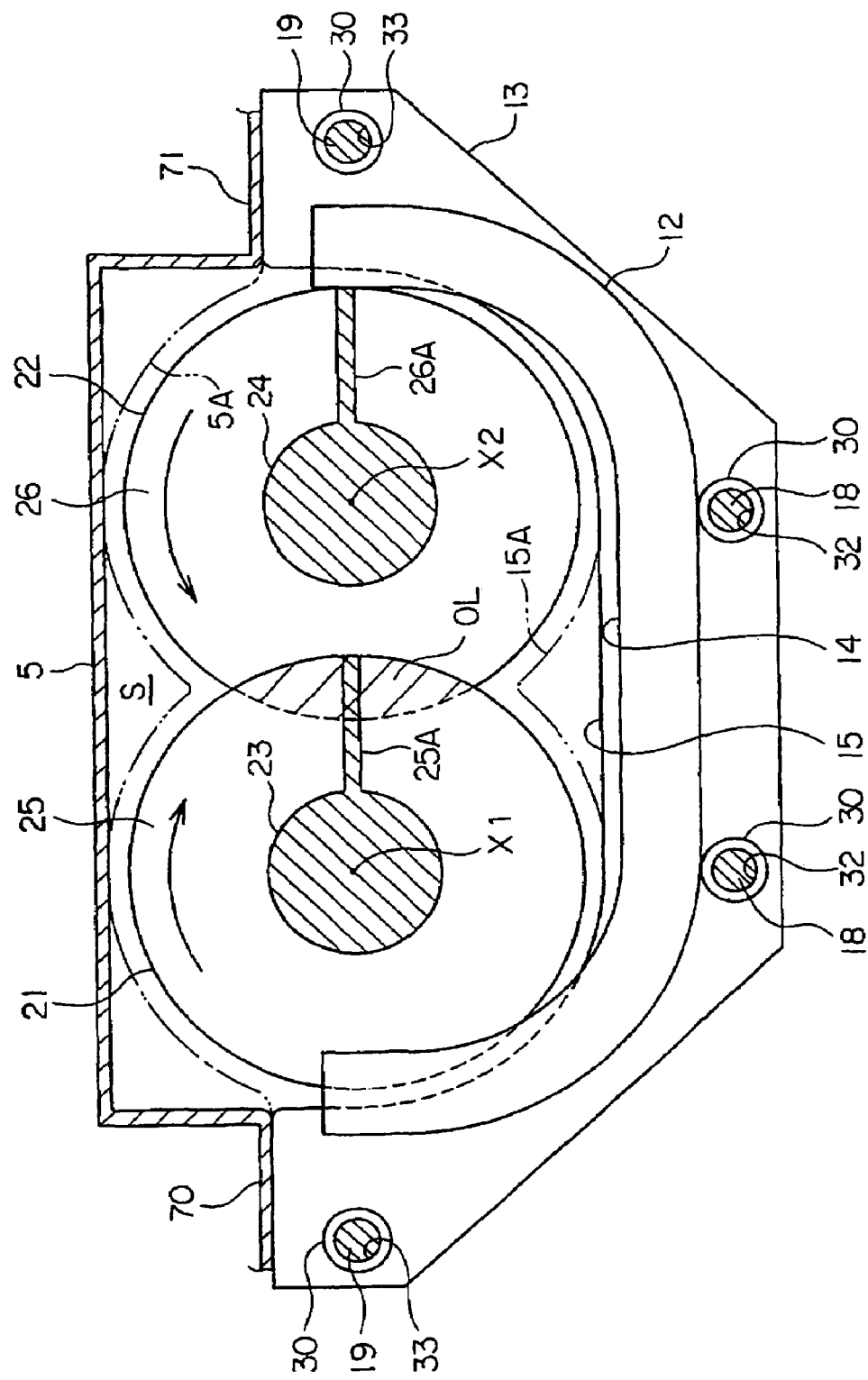
FIG. 8 is an enlarged sectional view along the VIII-VIII line in FIG. 2.
Figure 9:
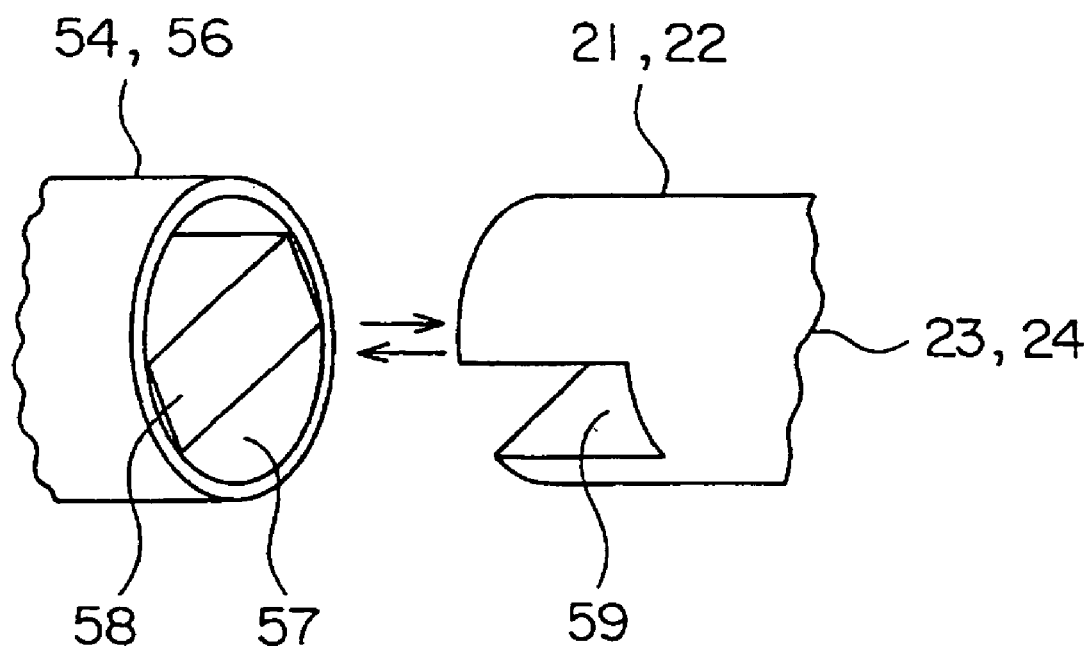
FIG. 9 is a perspective view illustrating the joining state of the gear shaft and output shaft with the screw shaft.
Figure 10:
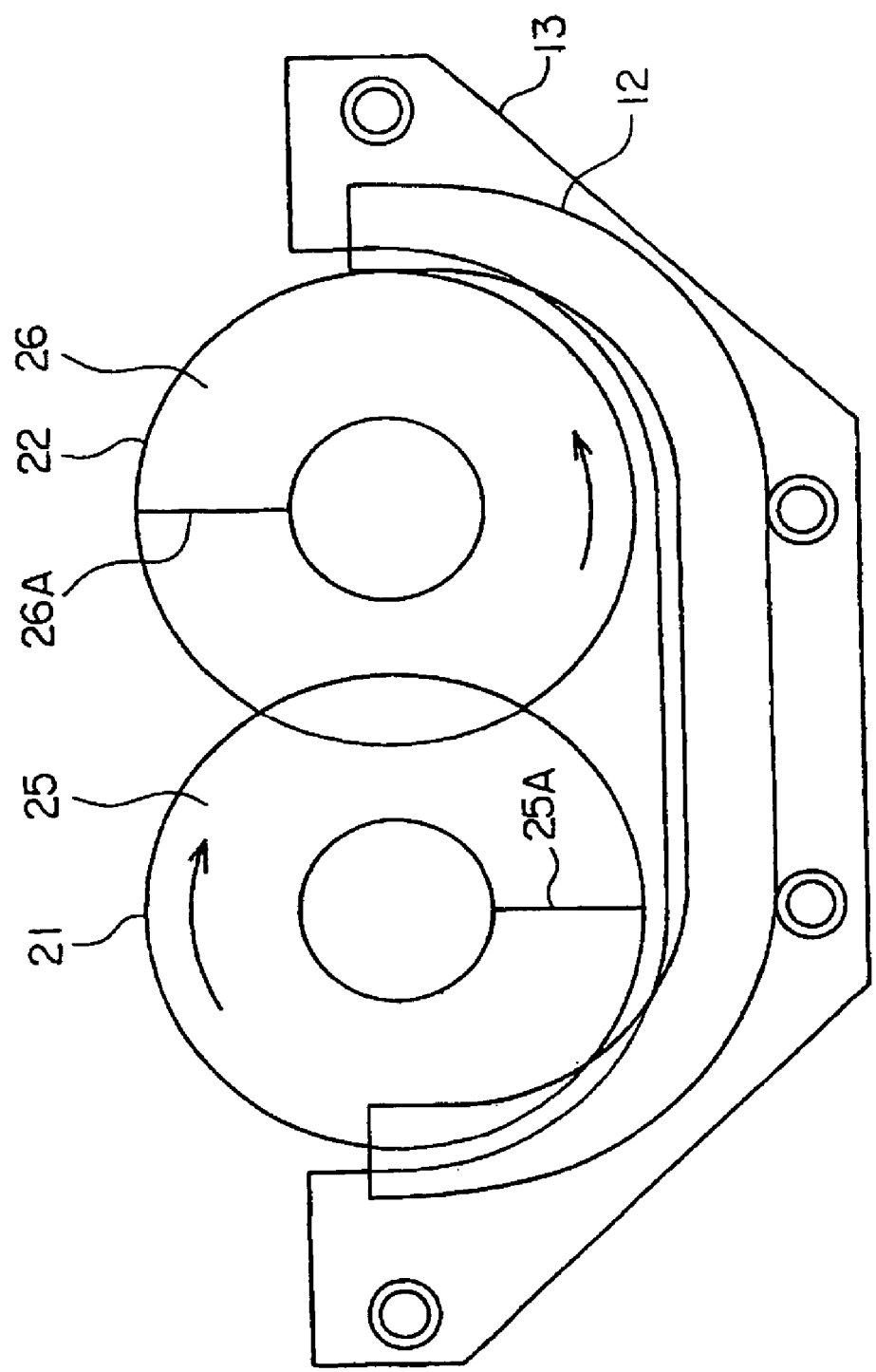
FIG. 10 illustrates the movement of the movable plate.
Figure 11:
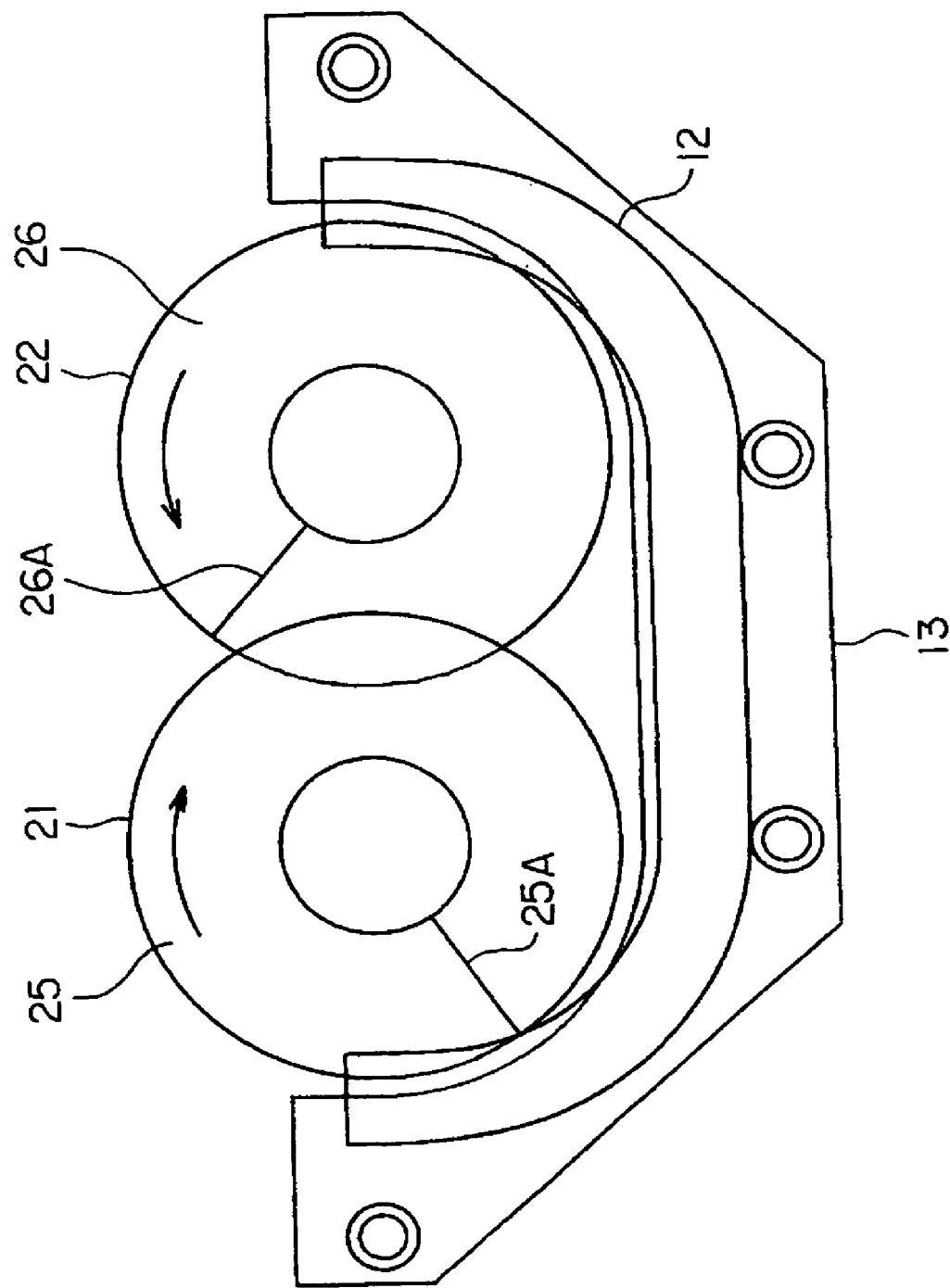
FIG. 11 illustrates the movement of the movable plate.
Figure 12:
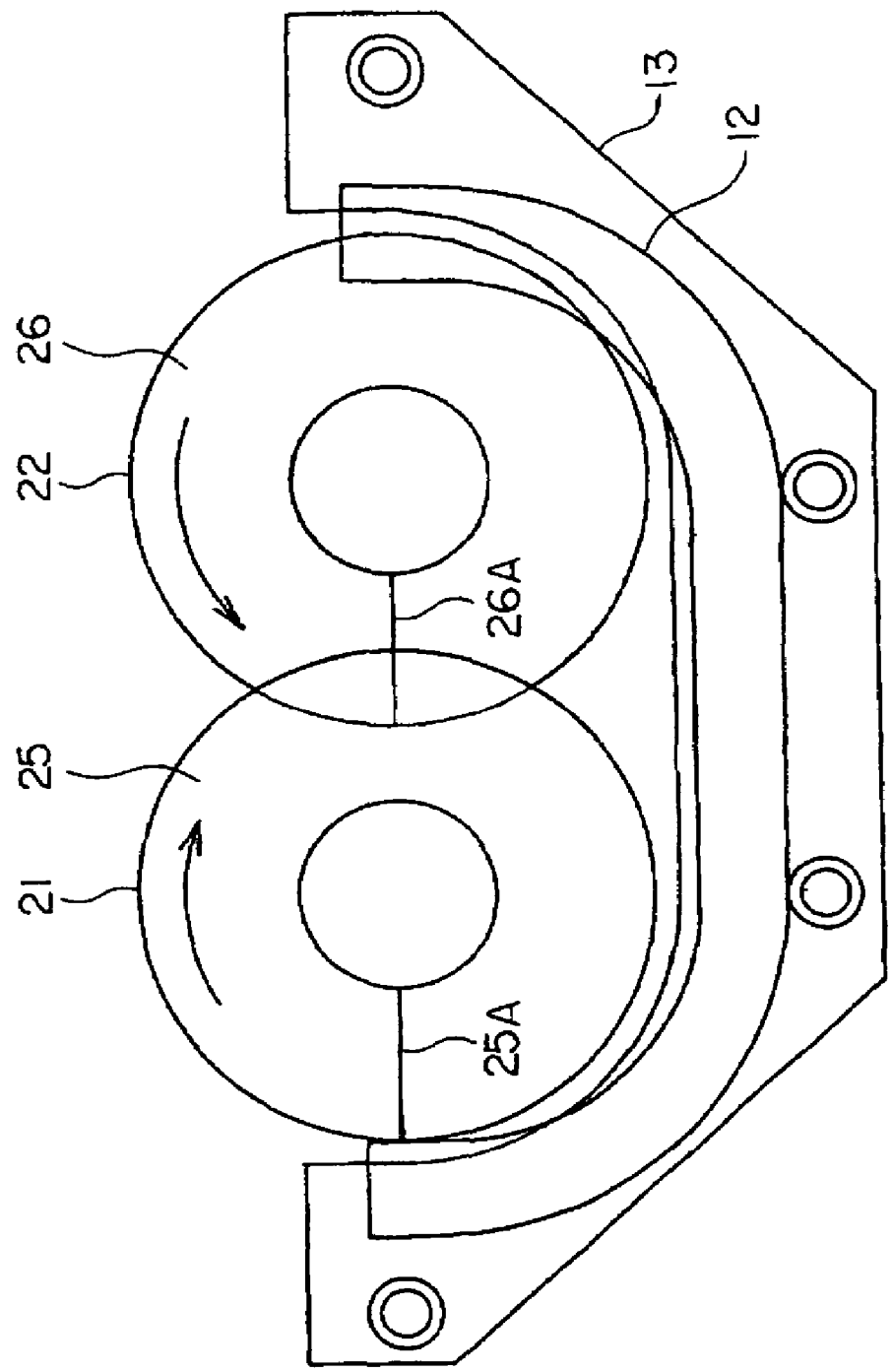
FIG. 12 illustrates the movement of the movable plate.
Figure 13:
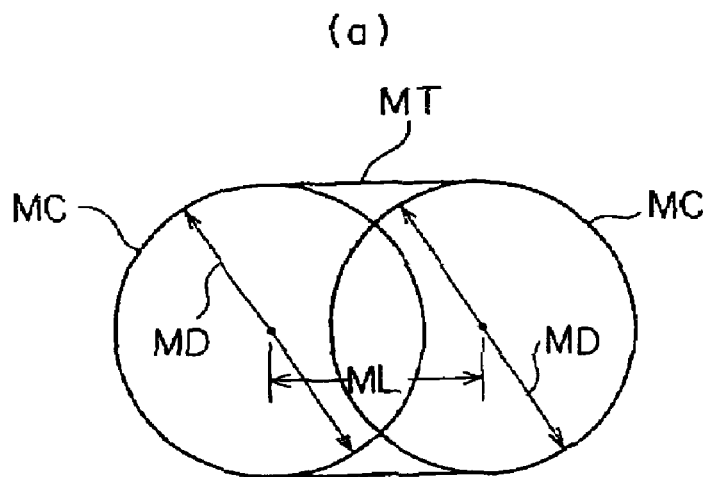
FIG. 13 illustrates the shape of the concaved section of the movable plate.
Figure 13:
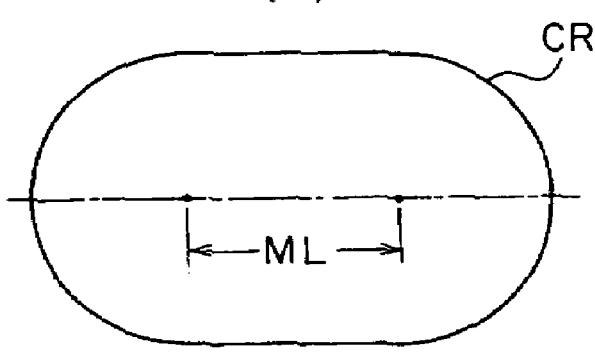
Figure 13:
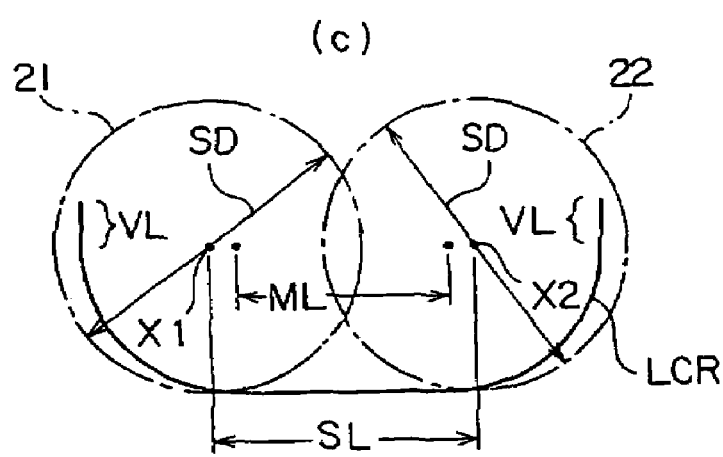
Figure 14:
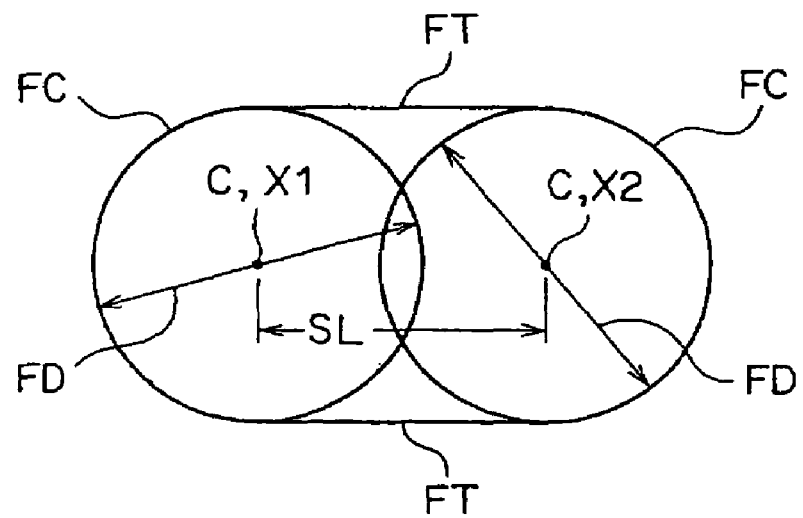
FIG. 14 illustrates the shape of the concaved section of the fixed plate.
Figure 14:
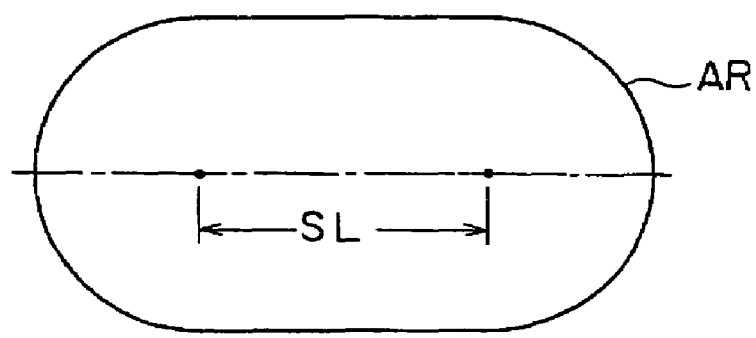
Figure 14:
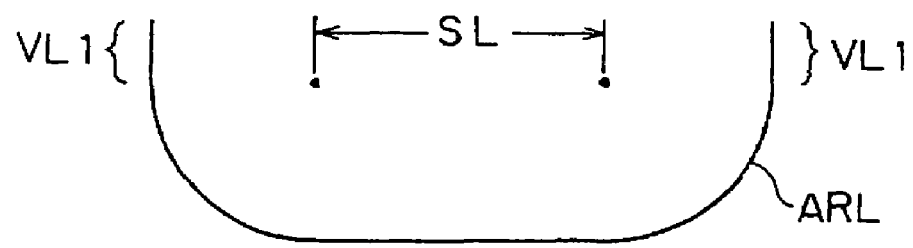

| [List of Elements | |
|---|---|
| 5 | COVER |
| 12 | MOVABLE PLATE |
| 13 | FIXED PLATE |
| 14, 15 | RECESS SECTION |
| 21, 22 | SCREWS |
| 25, 26 | BLADE SECTIONS |

What is claimed is:

1. A solid-liquid separator comprising a plurality of movable plates having recess sections open upward in a vertical direction and two screws each being rotatable about a generally horizontal axis and having a blade section, respectively and extending through the recess sections of those movable plates, wherein the recess sections of said movable plates are set to a size such that said movable plates are pushed to move by the blade sections of the two screws and the recess sections are formed to a shape allowing the screws to be lifted up in the vertical direction through the recess sections.

2. The solid-liquid separator according to claim 1, wherein said two screws are disposed so that parts of the blade sections thereof overlap each other.

3. The solid-liquid separator according to claim 1, wherein the winding direction of the blade sections of the screws and the rotation direction of the screws are so set that an object to be treated is transported in substantially the same direction by the screws.

4. The solid-liquid separator according to claim 1, further comprising a plurality of fixed plates having recess sections open upward, wherein said movable plates are disposed between said fixed plates, said two screws extend through the recess sections formed in said fixed plates and the recess sections formed in said movable plates, and the recess sections of said fixed plates are also formed to a shape allowing the screws to be lifted up.

5. The solid-liquid separator according to claim 4, wherein said two screws are disposed so that parts of the blade sections thereof overlap each other.

6. The solid-liquid separator according to claim 4, wherein the winding direction of the blade sections of the screws and the rotation direction of the screws are so set that an object to be treated is transported in substantially the same direction by the screws.

7. The solid-liquid separator according to claim 4, wherein the fixed plates and movable plates are disposed alternately one after another.

8. The solid-liquid separator according to claim 4, wherein some of said movable plates are disposed between said fixed plates.

9. The solid-liquid separator according to claim 4, wherein a filtrate flows down through gaps between the movable plates and fixed plates.

10. The solid-liquid separator according to claim 1, comprising a detachable cover for covering the upper part of said movable plates.

11. The solid-liquid separator according to claim 4, comprising a detachable cover for covering the upper part of the movable plates and fixed plates.

* * * * *